United States Patent
Lee et al.

(10) Patent No.: US 7,747,119 B2
(45) Date of Patent: Jun. 29, 2010

(54) MULTIMODE OPTICAL FIBER FOR HIGH RATE LAN, METHOD FOR MANUFACTURING THE SAME, AND TEST BED THEREOF

(75) Inventors: Dong-Wook Lee, Gyeonggi-do (KR); Byeong-Chul Kang, Seoul (KR); Byong-Yoon Kang, Gyeonggi-do (KR)

(73) Assignee: LS Cable Ltd., Anyang (KR)

( * ) Notice: Subject to any disclaimer, the term of this patent is extended or adjusted under 35 U.S.C. 154(b) by 771 days.

(21) Appl. No.: 11/725,832

(22) Filed: Mar. 19, 2007

(65) Prior Publication Data

US 2007/0172182 A1 Jul. 26, 2007

Related U.S. Application Data

(62) Division of application No. 10/940,474, filed on Sep. 14, 2004, now abandoned.

(30) Foreign Application Priority Data

Jul. 2, 2004 (KR) ........................ 10-2004-0051390

(51) Int. Cl.
*G02B 6/02* (2006.01)
*H04B 10/12* (2006.01)
(52) U.S. Cl. .................. 385/123; 384/124; 398/143; 398/161
(58) Field of Classification Search ................ 385/123, 385/124, 126, 127, 128, 122, 141; 398/52, 398/53, 81, 102, 143, 147, 158, 159, 161
See application file for complete search history.

(56) References Cited

U.S. PATENT DOCUMENTS

| | | | | |
|---|---|---|---|---|
| 4,165,224 A | * | 8/1979 | Irven et al. | 65/419 |
| 4,304,581 A | * | 12/1981 | Saifi | 65/419 |
| 4,657,575 A | * | 4/1987 | Roba | 65/413 |
| 4,921,516 A | * | 5/1990 | Roba | 65/419 |
| 6,618,534 B2 | * | 9/2003 | Abbott et al. | 385/123 |
| 6,724,965 B2 | * | 4/2004 | Abbott et al. | 385/123 |
| 6,873,775 B2 | * | 3/2005 | Jang et al. | 385/124 |
| 2002/0146224 A1 | * | 10/2002 | Abbott et al. | 385/124 |
| 2002/0197038 A1 | * | 12/2002 | Abbott et al. | 385/124 |

* cited by examiner

*Primary Examiner*—Brian M Healy
(74) *Attorney, Agent, or Firm*—Jones Day

(57) ABSTRACT

Disclosed is a method for manufacturing a multimode optical fiber for high data rate LAN using MCVD, which includes a deposition process for forming a clad layer and a core layer, doped with an additive for controlling a refractive index, on an inner wall of a quartz tube by injecting a deposition gas into the quartz tube and applying heat to outside of the quartz tube; and a collapse process, which is repeatedly conducted N times, for filling up a gap in the quartz tube by applying heat of a temperature over a deposition temperature to the quartz tube after the core layer is completely deposited. In the method, together with an $N-1^{th}$ collapse process, an etching process of injecting a reaction gas for etching into the quartz tube is conducted in order to eliminate a portion of which refractive index is transformed due to evaporation of the additive.

6 Claims, 6 Drawing Sheets

(a)

(b)

(c)

MULTIMODE OPTICAL FIBER FOR HIGH RATE LAN, METHOD FOR MANUFACTURING THE SAME, AND TEST BED THEREOF

CROSS-REFERENCE TO RELATED APPLICATION

This application is a divisional application of U.S. patent application Ser. No. 10/940,474, filed Sep. 14, 2004 now abandoned, which claims the benefit of Korean Patent Application No. 10-2004-0051390, filed Jul. 2, 2004, the entireties of which are incorporated herein by reference.

BACKGROUND OF THE INVENTION

1. Field of the Invention

The present invention relates to a multimode optical fiber and its manufacturing method, and more particularly to a multimode optical fiber for high data rate LAN (Local Area Network), which improves transmission properties for high data rate LAN by eliminating defects in a core region and also suggests a criteria for minimum transmission performance required for gigabit level optical transmission, and its manufacturing method.

2. Description of the Related Art

As the number of Internet users is increased, more transmission capacity is needed for stable communication service, so more and more interests are taken in 1- or 10-gigabit level LAN system using a multimode optical fiber as a transmission line, which gives better transmission performance together with a relatively lower maintenance cost rather than the conventional system. However, in spite of such expectation, the existing gigabit-level LAN system is not easy to cope with subscriber's demand for bandwidth, which is explosively increased, due to its structural disadvantage that it generally uses LEDs as a light source. Accordingly, there is a need for a transmission system which may use a laser diode as a light source capable of receiving more transmission capacity.

The transmission system using a laser diode as a light source may be efficiently used in a system of more than 10-gigabit level. However, more preferably, the system should be specified to meet user's demand at a low cost through a suitable compromise between a system configuration cost and a system performance, which are essential factors of LAN. VCSEL (Vertical Cavity Surface Emission Laser) diode and Fabry-Perot LD (Laser Diode) may be used at a relatively low cost among the existing laser diodes supporting a data rate over 1 gigabit.

However, though advantageously supporting a high data rate communication over a gigabit level, the laser diode causes several problems when it is used together with a multimode optical fiber, differently from LED. Representatively, since a laser diode is configured to irradiate a light only to a partial area of a core center of an optical fiber when the gigabit-level system is used, fine defects and irregularity in the core may sensitively transform an output signal, thereby exerting serious effects on performance deterioration of the system.

Thus, it is understood that research for an optical fiber manufacturing process which may eliminate such drawbacks in the core region is most essential to configure a system which may realize high data rate optical transmission regardless of the kind of a light source.

FIG. 1 shows MCVD (Modified Chemical Vapor Deposition), which is a representative optical fiber manufacturing method currently used. Sections (a), (b) and (c) in FIG. 1 respectively show a deposition process, a collapse process and a drawing process, which configure MCVD in order.

Referring to the section (a) of FIG. 1, in the deposition process, deposition gas such as $SiCl_4$, $GeCl_4$, $POCl_3$, He and $O_2$ is injected into a quartz tube 10 which generally rotates at 20 to 120 rpm, and a heat source 5 is slowly moved along an axial direction of the quartz tube 10 to heat outside of the tube, thereby forming a deposition layer 12 composed of a core and a clad.

More specifically, the deposition gas injected and flowed in the quartz tube 10 is heated up to a reaction temperature at a position adjacent to the heat source 5. At this time, due to thermal oxidization, a fine silica particle layer 11 is generated on an inner wall of the tube positioned in front of the heat source 5 and having a relatively low temperature, and the fine silica particle layer 11 is sintered to form the core/clad deposition layer 12. Whenever the heat source 5 moves once along the entire length of the quartz tube 10, one layer of the particle deposition layer is obtained. Thus, if such procedure is repeated several ten times and constitution of the deposition is changed to give a desired refractive index distribution for each layer, the clad and core deposition layers 12 are subsequently formed in the quartz tube 10.

After the deposition process is completed, the collapse process as shown in the section (b) of FIG. 1 follows. That is to say, if the outside of the quartz tube in which the clad and core deposition layers 12 are formed is heated over a deposition temperature (e.g., at 2000 to 2300° C.) by means of the heat source 5 moving in an axial direction, viscous flow is generated in the quartz tube 10, so inner and outer diameters of the tube are gradually decreased due to the difference of surface tension and pressure between the inner and outer walls. If this procedure is repeated several times, a gap G in the quartz tube 10 is substantially filled up, thereby making an optical fiber preform of a quartz rod shape. For the optical fiber preform having experienced the collapse process, the drawing process as shown in the section (c) of FIG. 1 is accomplished to resultantly obtain an optical fiber.

Generally, $GeO_2$ is doped as an additive to increase a refractive index while the core layer is formed in the deposition process. This additive is volatilized during the collapse process which is progressed at a higher temperature than the deposition process, as shown in the following reaction formula 1. In the reaction formula 1, (s) and (g) respectively indicate a solid state and a gas state of substance.

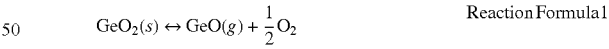

$$GeO_2(s) \leftrightarrow GeO(g) + \frac{1}{2}O_2 \qquad \text{Reaction Formula 1}$$

Due to the reaction like the reaction formula 1, $GeO_2$ concentration is decreased on the surface of the deposition layer of the core center, and an optical fiber preform finally made has a refractive index distribution with an index dip as shown in FIG. 2. In addition, GeO gas generated by the reaction is partially condensed again into $GeO_2$ in front of the moving heat source 5. Thus, as the heat source 5 is moved, internal diffusion of $GeO_2$ is activated again, so it probably cause an index peak that a refractive index is increased again at the core center as shown in FIG. 3.

Such index dip and index peak, and resultant axial irregularity of refractive index, significantly reduce a bandwidth of a multimode optical fiber, thereby deteriorating optical characteristics thereof. Thus, the index dip and peak are a problem which should be solved, particularly in the process of making a multimode optical fiber for a gigabit level transmission system in which an optical signal is irradiated only to a part of the core region. It is because deterioration of optical transmission characteristics is inevitable if the transformation of refractive index profile caused by volatilization or re-condensation of additives generated in the collapse process is not eliminated, even though the refractive index is ideally controlled in the deposition process.

In order to minimize the change of refractive index due to volatilization of $GeO_2$ during the collapse process, a method for compensating volatilized $GeO_2$ by injecting $O_2$ and $GeCl_4$ into a quartz tube just before the final collapse process as shown in the following reaction formula 2 has been proposed in U.S. Pat. No. 4,165,224 and No. 4,304,581 and by Akamatsu et al. (1977, *Appl. Phsy. Lett*, 31. 515~517).

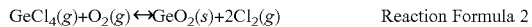
      $GeCl_4(g) + O_2(g) \leftrightarrow GeO_2(s) + 2Cl_2(g)$    Reaction Formula 2

In addition, U.S. Pat. No. 4,921,516 revealed that an overdoping process according to the reaction formula 2 should be conducted at a temperature lower than the collapse process so that a deposition layer exists in a colloidal state, and a thickness of the deposition layer should be gradually decreased in a forwarding direction of a heat source during the final collapse process in order to improve compensation effects.

U.S. Pat. No. 4,657,575 discloses that $Al_2O_3$ is used as an additive instead of $GeO_2$. According to this document, when $Al_2O_3$ with a melting point of 2045° C. is used for controlling a refractive index of the optical fiber, diffusion of the additive out of the core is suppressed during the collapse process rather than the case of using $GeO_2$ with a melting point of 1086° C., thereby decreasing an index dip, compared with the conventional processes.

Besides the aforementioned methods, a technique for making a final optical fiber preform after removing a volatilized portion of $GeO_2$ by etching just before the final process among the collapse processes has been proposed. At this time, the etching process may use a reaction gas such as HF (Hopland, 1978, *Electron. Lett.*, 14, 757~759) or gaseous fluoric compound (Liegois et al., 1982, *Non-Cryst. Solids*. 117, 247~250; Schneider et al. 1982, *Conf. Proc. Eur. Conf. Opt. Fibre Commun.* $8^{th}$., 36~40). U.S. Pat. No. 4,793,843 discloses that an amount of fluorine per a unit area may be increased and an etching effect may also be improved by using a fluoric compound such as $C_2F_6$, $C_3F_8$ and $n$-$C_4F_{10}$ together with $O_2$ in the etching process. However, this technique conducts several times of the etching process separatively just before the final collapse process, so a time gap exists between $N-1^{th}$ and $N^{th}$ collapse steps and thus $GeO_2$ is volatilized during the etching process. In addition, since there is a limit in decreasing an inner diameter of the tube just before the final collapse process due to the etching process, a volatilizing area of $GeO_2$ is still large, so it is substantially not easy to effectively eliminate the index dip.

Though such various techniques are proposed, there is realistically not obtained a multimode optical fiber whose drawbacks are sufficiently eliminated to be suitable for a gigabit level high data rate transmission system, so there is still a need for a new method capable of more effectively eliminating drawbacks of the core center such as an index dip and an index peak.

Meanwhile, in order to use a multimode optical fiber for a gigabit level high data rate LAN, a transmission protocol which provides an optimal transmission performance regardless of the kind of a light source should be suggested.

As a conventional manner of indicating the transmission characteristics of a multimode optical fiber, there is a Restricted Mode Launching Bandwidth (RMLB) regulated by FOTP-204. However, the kinds of light sources to which RMLB may be applied are restricted, so, if a light source or a light-exciting condition is changed in the actual use, a critical error may arise since RMLB does not satisfy an actually demanded bandwidth.

FOTP-220 regulates a method for measuring DMD (Differential Mode Delay) having an improved accuracy in comparison with RMLB. FOTP-220 is known as a method which may evaluate transmission characteristics of a multimode optical fiber more accurately regardless of the used light source than any other existing method. A transmission characteristic evaluation criterion of a multimode optical fiber according to FOTP-220 is specified in TIA-492AAAC, which however has limitations that it is restrictively applied to a multimode optical fiber with a core diameter of 50 μm, a transmission distance up to 300 m and an application wavelength of 850 nm, among 10-gigabit level optical fibers.

As mentioned above, transmission characteristics of a multimode optical fiber, which may be applied to all of 1-gigabit level and 10-gigabit level high data rate optical transmission systems and may be used at both 850 nm and 1300 nm regardless of the kind of a light source, has not been proposed in the past, so there is a need for its alternative.

SUMMARY OF THE INVENTION

The present invention is designed in consideration of such problems, and therefore it is an object of the present invention to provide a method for manufacturing a multimode optical fiber which may eliminate drawbacks of a core region, caused by evaporation of an additive for controlling a refractive index during a collapse process in MCVD (Modified Chemical Vapor Deposition).

Another object of the invention is to provide a multimode optical fiber which derives transmission characteristics at 850 nm and 1300 nm together by means of only DMD (Differential Mode Delay) measured at 850 nm, thereby capable of being applied to a gigabit level high data rate optical transmission system.

Still another object of the invention is to provide a test bed for evaluating a transmission performance of an optical fiber which is to be applied to a gigabit level optical transmission system.

In order to accomplish the above object, the present invention provides a method for manufacturing a multimode optical using MCVD, which includes a deposition process for forming a clad layer and a core layer, to which an additive for controlling a refractive index is doped, on an inner wall of a quartz tube by injecting a deposition gas into the quartz tube and applying heat to outside of the quartz tube; and a collapse process, which is repeatedly conducted N times, for filling up a gap in the quartz tube by applying heat of a temperature over a deposition temperature to the quartz tube after the core layer is completely deposited, wherein, together with an $N-1^{th}$ collapse process, an etching process of injecting a reaction gas for etching into the quartz tube is conducted in order to eliminate a portion of which refractive index is transformed due to evaporation of the additive.

Preferably, the additive for controlling a refractive index is $GeO_2$.

In addition, the reaction gas for etching may be $O_2$ and $C_2F_6$.

It is preferred that a collapse rate at the $N-1^{th}$ collapse process is set to 2.5 to 4.5 mm²/s, and a flow ratio of $O_2$ to $C_2F_6$ is in the range of 2.5 to 30.

In addition, it is also preferable that a flow rate of $O_2$ is in the range of 50 to 120 sccm, while a flow rate of $C_2F_6$ is in the range of 4 to 20 sccm.

Preferably, a positive pressure is applied to inside of the quartz tube during the collapse process. At this time, the positive pressure is preferably in the range of 0 to 10 mmWC.

According to another aspect of the invention, there is also provided a multimode optical fiber for an optical LAN (Local Area Network), which has a core diameter of 50±3 μm, transmits a signal of 1-gigabit (Gb) level at 850 nm and 1300 nm, and has a transmission distance more than 600 m at both wavelengths, wherein, among DMD (Differential Mode Delay) features at 850 nm, a maximum time delay difference at the entire area of a core is within 2.0 ns/km, and wherein a maximum time delay difference in a range where a radial offset is 5 to 18 μm is within 2.0 ns/km.

At this time, in case of an optical fiber having a transmission distance more than 600 m and 2000 m at 850 nm and 1300 nm respectively, among DMD features at 850 nm, a maximum time delay difference at the entire area of a core is within 2.0 ns/km, a maximum time delay difference in a range where a radial offset is 5 to 18 μm is within 1.0 ns/km, and all time delay differences of the core except for a center is more than 0.4 ns/km.

According to another embodiment of the invention, there is also provided a multimode optical fiber for an optical LAN, which has a core diameter of 62.5±3 μm, transmits a signal of 1-gigabit (Gb) level at 850 nm and 1300 nm, and has a transmission distance more than 300 m and 500 m at 850 nm and 1300 nm respectively, wherein, among DMD features at 850 nm, a maximum time delay difference at the entire area of a core is within 5.0 ns/km, and wherein a maximum time delay difference in a range from a core center to a point where a radial offset is 16 μm is within 3.5 ns/km.

According to still another embodiment of the present invention, there is also provided a multimode optical fiber for an optical LAN, which has a core diameter of 50±3 μm or 62.5±3 μm, transmits a signal of 1-gigabit (Gb) level at 850 nm and 1300 nm, and has a transmission distance more than 500 m and 1000 m at 850 nm and 1300 nm respectively, wherein, among DMD features at 850 nm, a maximum time delay difference at the entire area of a core is within 3.0 ns/km, wherein a maximum time delay difference in a range from a core center to a point where a radial offset is 16 μm is within 2.0 ns/km, and wherein all time delay differences of the core except for the center is more than 0.4 ns/km.

According to further another embodiment of the present invention, there is also provided a multimode optical fiber for an optical LAN, which has a core diameter of 50±3 μm, transmits a signal of 10-gigabit (Gb) level at 850 nm, and has a transmission distance more than 300 m, wherein, among DMD features at 850 nm, a maximum time delay difference at the entire area of a core is within 0.3 ns/km, and wherein a maximum time delay difference in a range where a radial offset is 5 to 18 μm is within 0.3 ns/km.

In case of an optical fiber having a transmission distance more than 500 m, a maximum time delay difference at the entire area of a core is within 0.15 ns/km, and a maximum time delay difference in a range where a radial offset is 5 to 18 μM is within 0.15 ns/km.

In still another aspect of the invention, there is provided a test bed for evaluating transmission characteristics of a multimode optical fiber used for a gigabit level optical transmission system, which includes a light source and a photo-detector substantially connected to both ends of an optical fiber sample to be tested; a fiber shaker provided to at lease one side of the optical fiber sample to give shaking thereto; a bit error rate tester connected to the light source and the photo-detector for detecting an error of an optical signal; a visual analyzer connected to the photo-detector for visually displaying a waveform of a received light; an optical powermeter for measuring an output level of the received light; and a variable optical attenuator combined to one side of the optical fiber sample for the purpose of attenuating control of the optical signal.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
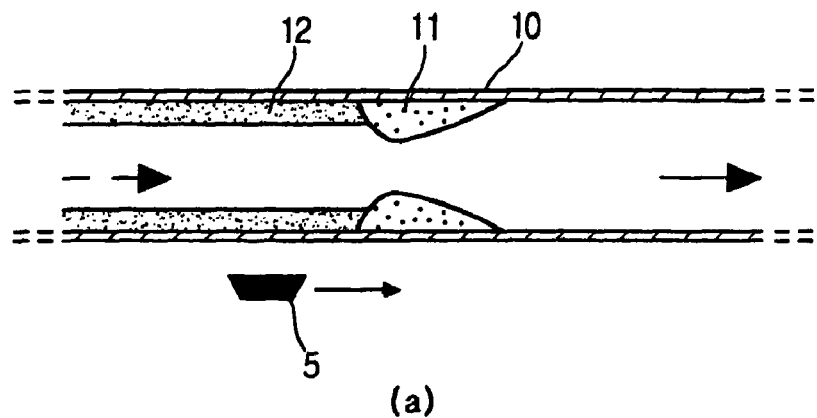
FIG. 1 is a diagram showing the procedure of general MCVD (Modified Chemical Vapor Deposition)
Figure 1:
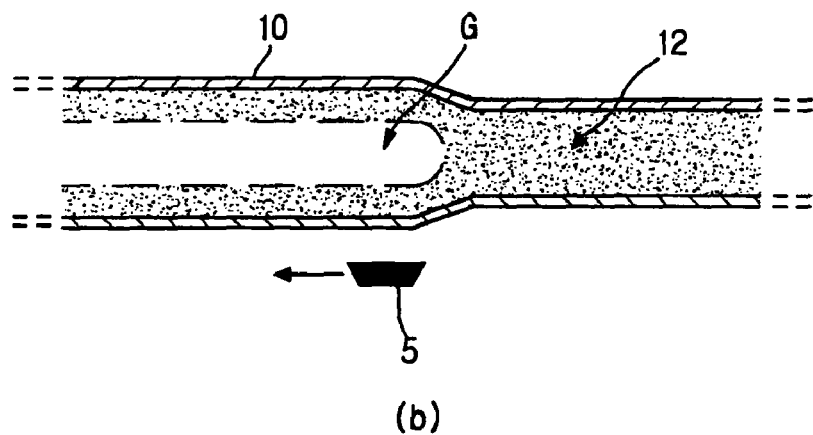
Figure 1:
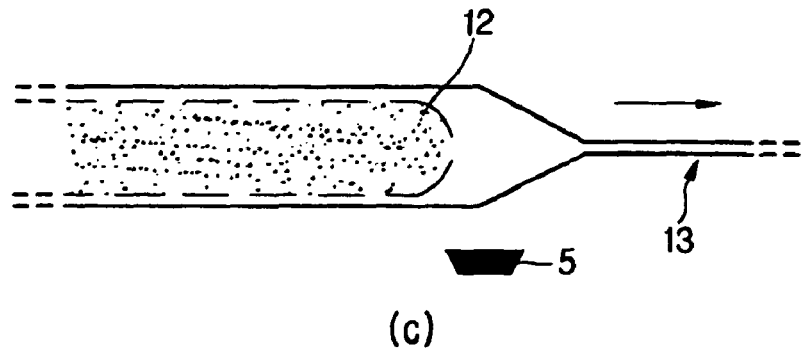
Figure 2:
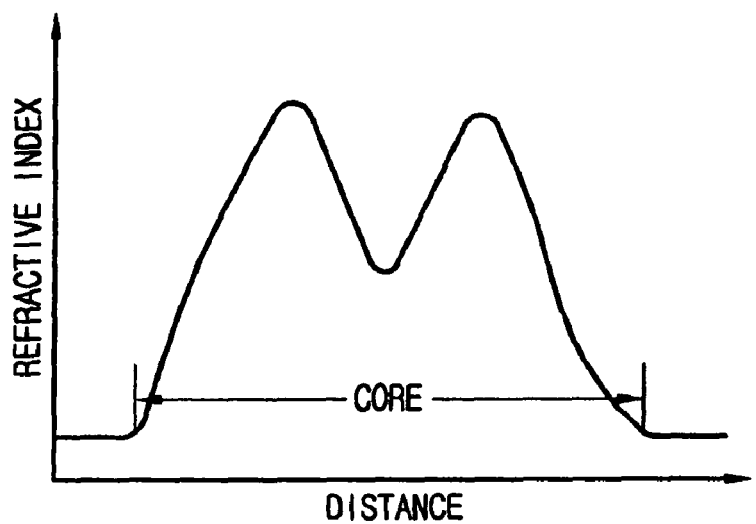
FIG. 2 is a graph showing an index dip generated in a core region of an optical fiber according to the prior art.
Figure 3:
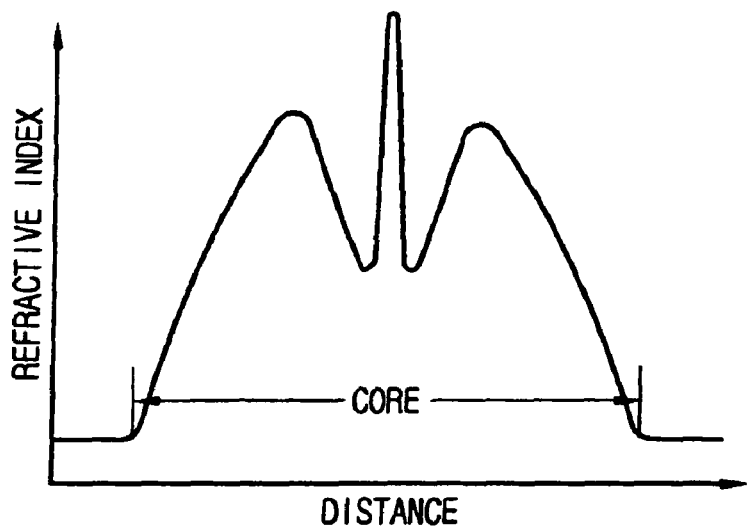
FIG. 3 is a graph showing an index peak generated in a core region of an optical fiber according to the prior art.

Hereinafter, the present invention will be described in more detail referring to the drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 4:
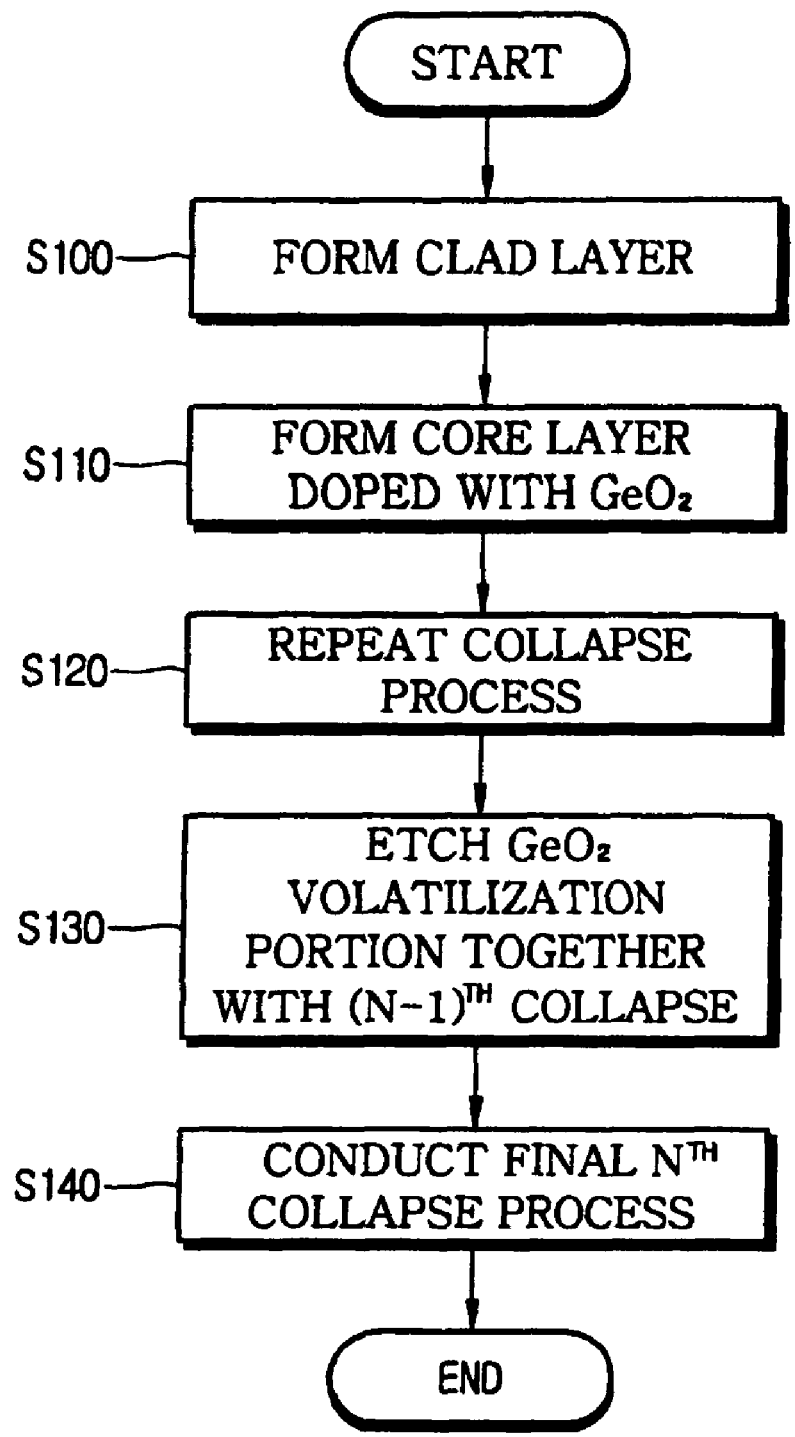
FIG. 4 is a flowchart for illustrating the process of manufacturing a multimode optical fiber according to a preferred embodiment of the present invention.

FIG. 4 is a flowchart for illustrating a method for manufacturing a multimode optical fiber according to a preferred embodiment of the present invention.

Referring to FIG. 4, the steps S100 and S110 are corresponding to a process of depositing a clad layer and a core layer subsequently by injecting a deposition gas into a preform quartz tube and heating outside of the tube. A well-known technique used in MCVD (Modified Chemical Vapor Deposition) may be applied to this deposition process. Here, an additive for controlling a refractive index is particularly doped when the core layer is formed in order to increase a refractive index of the core layer rather than that of the clad layer. For the additive, $GeO_2$ may be preferably used, but not limitedly.

After the clad/core deposition process is completed, a collapse process is repeatedly conducted at a temperature over the deposition temperature (S120). More specifically, heat is applied to the quartz tube in the collapse process so that a maximum surface temperature of the quartz tube preferably is kept in the range of 2000 to 2400° C. During the collapse process, both inner and outer walls of the tube reach a softening temperature, and thus a viscous flow is generated in a center direction of the tube due to surface tension and pressure difference between the inner and outer walls of the tube, so collapse of the tube is progressed.

Preferably, a positive pressure in the range of 0 to 10 mmWC is applied to the inside of the quartz tube for the purpose of stability of the tube shape. In addition, an advancing velocity of the heat source is preferably set in the range of 34 to 40 mm/s, and a rotating speed of the quartz tube is preferably set in the range of 15 to 32 rpm, which is slower than that of the deposition process.

In the present invention, such a collapse process is repeatedly conducted N times, and $N-1^{th}$ process, conducted just before the final collapse process, is progressed together with an etching process for a volatilized portion of the additive (S130). For example, if the collapse process is repeated 6 times, a reaction gas for etching the volatilized portion of $GeO_2$ is injected together with the fifth collapse process. At this time, it is preferred that an advancing velocity of the heat source is set to 20 mm/s and a collapse rate is set in the range of 2.5 to 4.5 mm$^2$/s. In addition, it is preferable that the inner diameter of the quartz tube is small in order to minimize the volatilized area of GeO. However, considering workability of the manufacturing procedure, the inner diameter of the quartz tube is preferably kept to about 2 mm, more preferably to 1 mm.

The reaction gas for etching preferably uses $O_2$ and $C_2F_6$. Here, a flow ratio of $O_2$ to $C_2F_6$ is preferably set in the range of 2.5 to 30 in order to obtain excellent etching efficiency. Accordingly, a flow rate of $O_2$ is corresponding to the range of 50 to 120 sccm, while a flow rate of $O_2F_6$ is set in the range of 4 to 20 sccm. At this time, flow rates of $O_2$ and $C_2F_6$ are selected to satisfy the aforementioned flow ratio.

After the collapse process and the etching process are conducted at the same time, the final $N^{th}$ collapse process is conducted to fill up a gap in the tube, thereby making an optical fiber preform of a quartz rod shape (S140).

Figure 5:
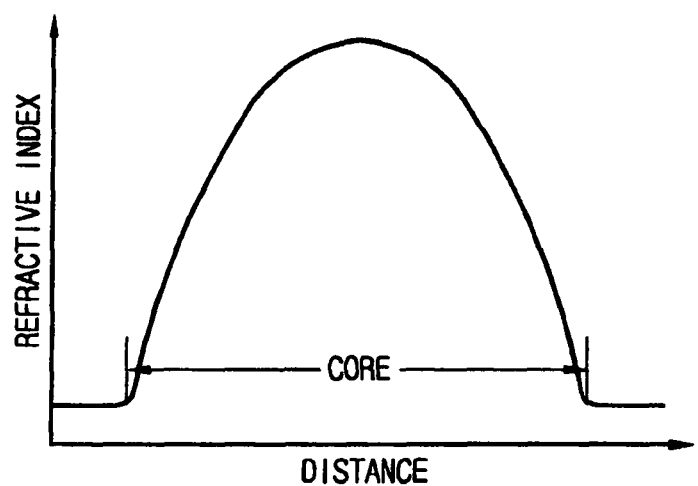
FIG. 5 is a graph showing that an index dip is removed in a core region of an optical fiber according to the present invention.

As described above, if a defected portion of the core region is etched together with collapsing just before the final collapse process, it is possible to obtain a multimode optical fiber having a refractive index profile without an index dip or an index peak at the core region, as shown in FIG. 5.

Figure 6:
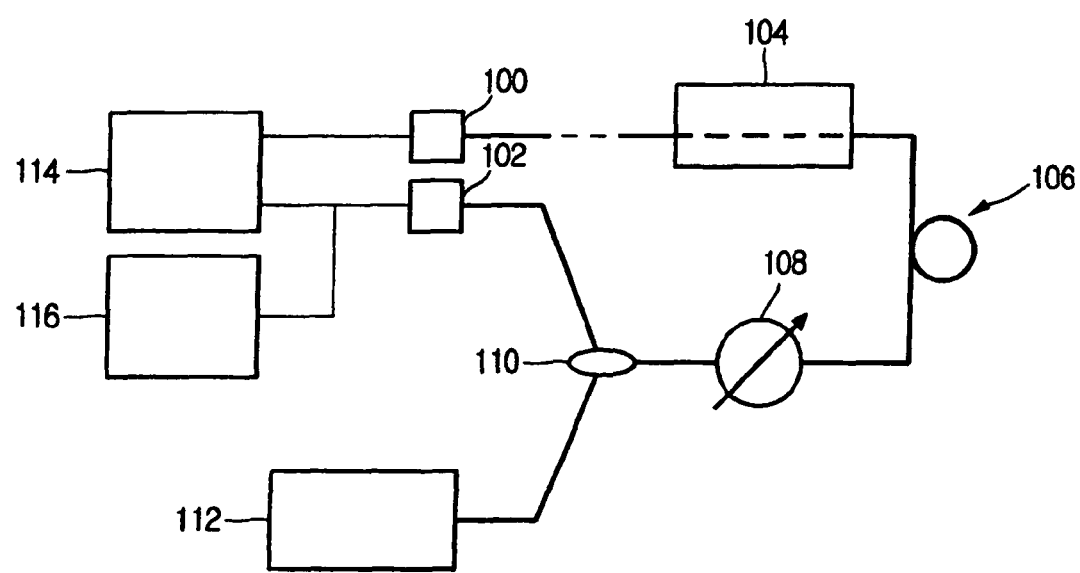
FIG. 6 is a block diagram showing a test bed for measuring optical transmission characteristics of an optical fiber according to the present invention.

According to another aspect of the invention, a test bed as shown in FIG. 6 is provided for measuring transmission characteristics of a multimode optical fiber in which defects of the core region are eliminated as mentioned above.

Referring to FIG. 6, the test bed of the present invention is applied to a 1-gigabit level and 10-gigabit level optical transmission systems and includes a light source (Tx) 100 and a photo-detector (Rx) 102 substantially connected to both ends of an optical fiber sample 106 to be tested, a fiber shaker 104 for giving shaking to at lease one side of the optical fiber sample 106, a BERT (Bit Error Rate Tester) 114 for detecting an error of a digital optical signal, an optical powermeter 112, and a visual analyzer 116. The photo-detector 102 and the optical powermeter 112 are connected to the optical fiber sample 106 through an optical coupler 110, and a variable optical attenuator 108 is combined to one side of the optical fiber sample 106 for the purpose of attenuating control of the optical signal.

For the light source 100, an LED (Light Emitting Diode) or a laser diode, which have a specification well matched with the system performance, are adopted and it is preferably operated with a diameter of 5 μm and a pulse width of 0.1 to 2 ns like a general measurement protocol FOTP-220.

According to the configuration described above, transmission of a digital optical signal, error detection and measurement of an optical output are conducted with exerting environmental impacts, which may happen in an actual system, to the optical fiber sample 106, in a form of shaking using the fiber shaker 104. That is to say, the BERT 114 is connected to the light source 100 and the photo-detector 102 to substantially evaluate a transmission performance by detecting an error of a signal, and the visual analyzer 116 visually displays a signal received in the photo-detector 102 to outside. In addition, the optical powermeter 112 measures an output level of a digital signal which is sent from the light source 100 and then received in the photo-detector 102 via the optical fiber sample 106.

By using the test bed, it is possible to measure time delay and pulse distortion of each mode in a multimode optical fiber core under the same circumstance as an actual system, find out fine irregularity in the optical fiber core and then analogize corresponding deterioration of bandwidth features, and thus distinguish a multimode optical fiber with minimum transmission characteristics and minimum bandwidth features independent on the light source.

After testing a lot of optical fiber samples by using the aforementioned test bed, it is found that DMD of the optical fiber has a certain correlation to a transmission performance.

Figure 7:
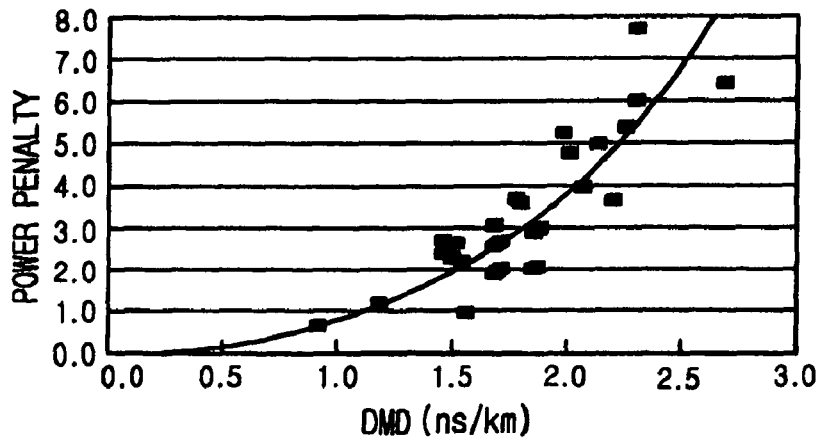
FIG. 7 is a graph showing a power penalty according to DMD (Differential Mode Delay) measured at 850 nm.

FIG. 7 is a graph showing an example of distribution of power penalties according to DMD measured at 850 nm, namely values, converted into power, showing effects caused by bad transmission characteristics. This embodiment uses an optical fiber with a core diameter of 62.5 μm and a clad diameter of 125 μm, and many samples in which DMD characteristics are variously distributed are used. Here, a difference of reaching times of signals at a 25% height compared with a maximum value of a pulse signal at a certain point (r) in the core region is defined as 'an output pulse width', and a early reached one among 25% points of signals is defined as 'a fast time delay (see $T_{r\_fast}$ in FIG. 9)' and a lately reached one is defined as 'a slow time delay $T_{r\_slow}$. At this time, $DMD_r$ for each region of the core is expressed by the following equation 1. In equation 1, $T_{ref}$ is a pulse width of an input pulse signal.

$$DMD_r = T_{r\_slow} - T_{r\_fast} - T_{r\_ref}| \qquad \text{Equation 1}$$

Figure 9:
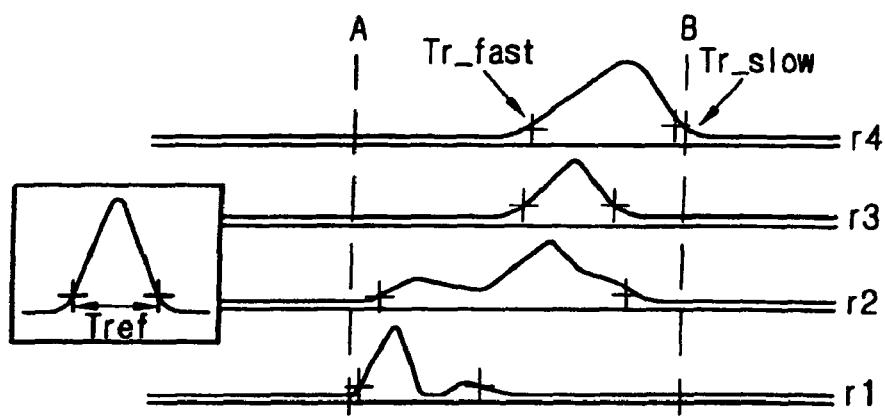
FIG. 9 is a graph schematically showing DMD of an optical signal transmitted through the multimode optical fiber according to the present invention.

Referring to FIG. 7, a minimum DMD required for distinguishing an optical fiber with a transmission distance more than 500 m in a 1-gigabit level transmission system using 850 nm is defined as a value obtained by deducting a pulse width $T_{ref}$ of an input pulse signal from a maximum time delay difference in the entire region of the core, namely a difference between a fastest value (see a datum line A in FIG. 9) among fast time delays $T_{r\_fast}$ and a slowest time delay value (see a datum line B in FIG. 9). The minimum DMD is preferably not more than 3.0 ns/km in consideration of regulations of IEEE802.3z and ae, which tells a power penalty less than about 4 dB to be reasonable for transmission characteristics.

Figure 10:
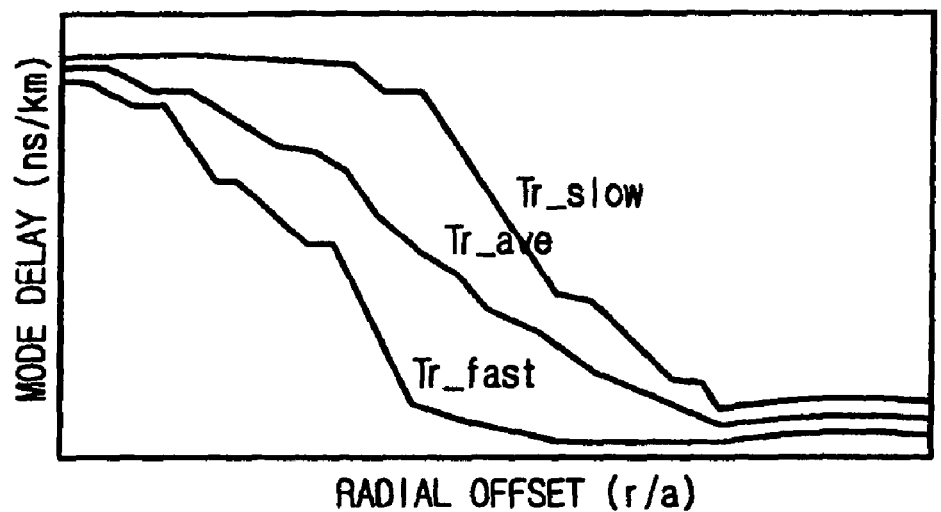
FIG. 10 is a graph showing a mode delay for each reaching time according to radial offset of the multimode optical fiber according to the present invention.
Figure 11:
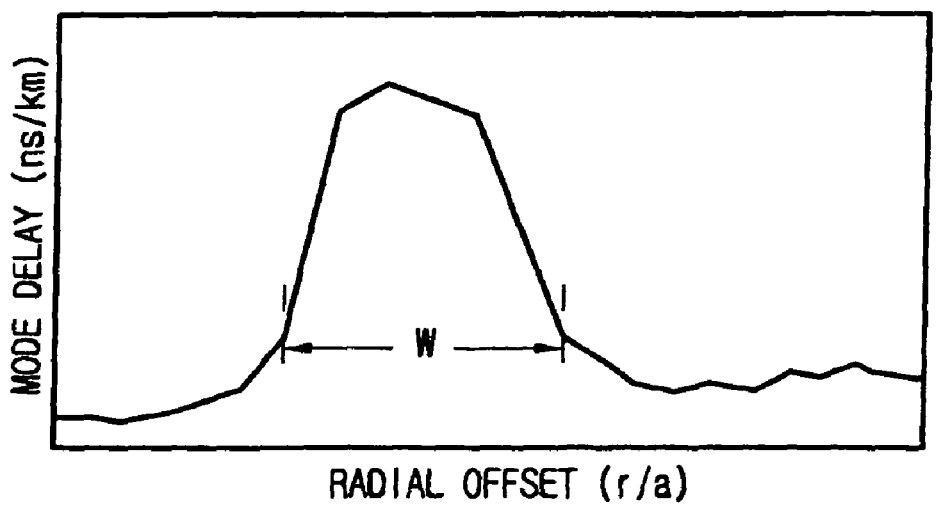
FIG. 11 is a graph showing pulse diffusion corresponding to time delay of the multimode optical fiber according to the present invention.

Here, the fast time delay $T_{r\_fast}$, the slow time delay $T_{r\_slow}$, and their average time delay $T_{r\_ave}$ may be expressed in aspect of radial offset in the core region, as shown in the graph of FIG. 10. In addition, a pulse diffusion W according to time delay in the core may be expressed for the radial offset as shown in FIG. 11, which shows that the pulse diffusion is increased as the time delay value is increased.

Figure 8:
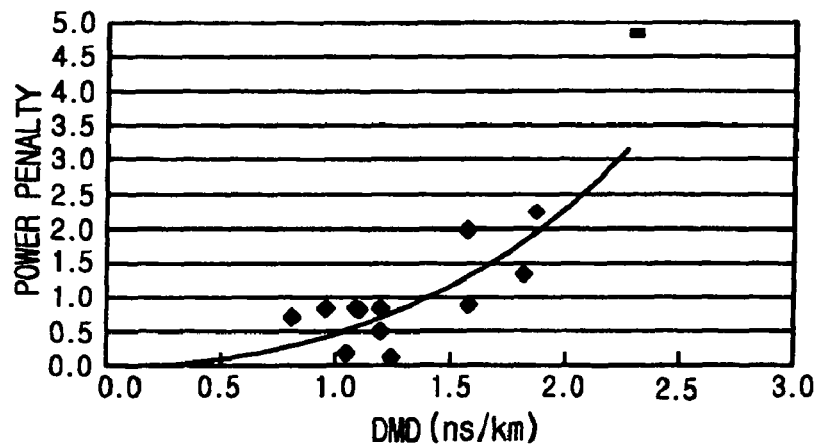
FIG. 8 is a graph showing a power penalty according to DMD measured at 1300 nm.

Meanwhile, FIG. 8 shows distribution of power penalties according to DMD measured at 1300 nm.

Referring to FIG. 8, a minimum DMD required for distinguishing an optical fiber with a transmission distance more than 1000 m in a 1-gigabit level system using 1300 nm is defined as a maximum time delay difference in a region where a radial offset in the core is ranged from 5 µm to 18 µm. However, if the maximum time delay difference is too large, the bandwidth is narrowed beyond an allowable value. Thus, the maximum time delay difference is preferably not more than 2.0 ns/km.

According to the results, an optical fiber which meets a minimum transmission performance proposed at 850 nm also satisfies a minimum transmission performance at 1300 nm. Thus, it is possible to derive a transmission performance feature at both 850 nm and 1300 nm only by using DMD characteristics measured at 850 nm.

By using this method, various kinds of multimode optical fibers are evaluated together with the cases for 1-gigabit level and 10-gigabit level systems, and thus conditions for an optical fiber which satisfies each transmission characteristic may be proposed as below on the basis of the evaluation results.

That is to say, in case of a multimode optical fiber for an optical LAN (Local Area Network) which has a core diameter of 50±3 µm, transmits a signal of 1-gigabit (Gb) level at 850 nm and 1300 nm, and has a transmission distance more than 600 m at both wavelengths, a maximum time delay difference at the entire area of the core among DMD features at 850 nm should be within 2.0 ns/km, and a maximum time delay difference in a range where a radial offset is 5 to 18 µm should be within 2.0 ns/km.

In case of an optical fiber for an optical LAN which has a transmission distance of 600 m and 2000 m at 850 nm and 1300 nm respectively, a maximum time delay difference at the entire area of the core among DMD features at 850 nm should be within 2.0 ns/km, a maximum time delay difference in a range where a radial offset is 5 to 18 µm should be within 1.0 ns/km, and all time delay differences of the core except for the center should be more than 0.4 ns/km. Such a multimode optical fiber may be applied to a standard campus backbone or the like which generally has a link distance of 2000 m.

In addition, in case of a multimode optical fiber for an optical LAN which has a core diameter of 62.5±3 µm, transmits a signal of 1-gigabit (Gb) level at 850 nm and 1300 nm, and has a transmission distance more than 300 m and 500 m at 850 nm and 1300 nm respectively, when considering the aforementioned power penalty regulated by IEEE802.3z or ae, a maximum time delay difference at the entire area of the core among DMD features at 850 nm should be within 5.0 ns/km, and a maximum time delay difference in a range from a core center to a point where a radial offset is 16 µm should be within 3.5 ns/km. Such a multimode optical fiber may be applied to a building backbone or between stories of a building, which generally have a link distance of about 500 m.

In addition, in case of a multimode optical fiber for an optical LAN which has a core diameter of 50±3 µm or 62.5±3 µm, transmits a signal of 1-gigabit (Gb) level at 850 nm and 1300 nm, and has a transmission distance more than 500 m and 1000 m at 850 nm and 1300 nm respectively, a maximum time delay difference at the entire area of the core among DMD features at 850 nm should be within 3.0 ns/km, a maximum time delay difference in a range from a core center to a point where a radial offset is 16 µm should be within 2.0 ns/km, and all time delay differences of the core except for the center should be more than 0.4 ns/km.

Meanwhile, in case of a multimode optical fiber for an optical LAN which has a core diameter of 50±3 µm, transmits a signal of 10-gigabit (Gb) level at 850 nm, and has a transmission distance more than 300 m, a maximum time delay difference at the entire area of the core among DMD features at 850 nm should be within 0.3 ns/km, and a maximum time delay difference in a range where a radial offset is 5 to 18 µm should be within 0.3 ns/km.

In case of an optical fiber having a transmission distance more than 500 m, a maximum time delay difference at the entire area of the core should be within 0.15 ns/km, and a maximum time delay difference in a range where a radial offset is 5 to 18 µM should be within 0.15 ns/km.

A multimode optical fiber satisfying such conditions described above then has a power penalty within an allowable value for various light sources such as a laser diode in a 1-gigabit level or 10-gigabit level high data rate transmission network, thereby giving an optimal transmission performance.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

APPLICABILITY TO THE INDUSTRY

As described above, the present invention is capable of eliminating defects of the core center region such as an index dip or an index peak, thereby providing a multimode optical fiber which may be applied to a gigabit level high data rate LAN regardless of the kind of a light source.

In addition, according to the present invention, it is possible to derive minimum transmission characteristics of 850 nm and 1300 nm only by measuring DMD features at a single wavelength of 850 nm, thereby improving product test efficiency, productivity and workability rather than the prior art.

What is claimed is:

1. A multimode optical fiber for an optical LAN (Local Area Network), which has a core diameter of 50±3 µm, transmits a signal of 1-gigabit (Gb) level at 850 nm and 1300 nm, and has a transmission distance more than 600 m at both wavelengths, wherein, among DMD (Differential Mode Delay) features at 850 nm, a maximum time delay difference at the entire area of a core is within 2.0 ns/km, and
   wherein a maximum time delay difference in a range where a radial offset is 5 to 18 µm is within 2.0 ns/km.

2. The multimode optical fiber according to claim 1, wherein an optical fiber having a transmission distance more than 600 m and 2000 m at 850 nm and 1300 nm respectively is characterized in that
   among DMD features at 850 nm, a maximum time delay difference at the entire area of a core is within 2.0 ns/km,
   a maximum time delay difference in a range where a radial offset is 5 to 18 µm is within 1.0 ns/km, and
   all time delay differences of the core except for a center is more than 0.4 ns/km.

3. A multimode optical fiber for an optical LAN, which has a core diameter of 62.5±3 µm, transmits a signal of 1-gigabit (Gb) level at 850 nm and 1300 nm, and has a transmission distance more than 300 m and 500 m at 850 nm and 1300 nm respectively, wherein, among DMD features at 850 nm, a maximum time delay difference at the entire area of a core is within 5.0 ns/km, and wherein a maximum time delay difference in a range from a core center to a point where a radial offset is 16 μm is within 3.5 ns/km.

4. A multimode optical fiber for an optical LAN, which has a core diameter of 50±3 μm or 62.5±3 μm, transmits a signal of 1-gigabit (Gb) level at 850 nm and 1300 nm, and has a transmission distance more than 500 m and 1000 m at 850 nm and 1300 nm respectively, wherein, among DMD features at 850 nm, a maximum time delay difference at the entire area of a core is within 3.0 ns/km, wherein a maximum time delay difference in a range from a core center to a point where a radial offset is 16 μm is within 2.0 ns/km, and wherein all time delay differences of the core except for the center is more than 0.4 ns/km.

5. A multimode optical fiber for an optical LAN, which has a core diameter of 50±3 μm, transmits a signal of 10-gigabit (Gb) level at 850 nm, and has a transmission distance more than 300 m, wherein, among DMD features at 850 nm, a maximum time delay difference at the entire area of a core is within 0.3 ns/km, and wherein a maximum time delay difference in a range where a radial offset is 5 to 18 μm is within 0.3 ns/km.

6. The multimode optical fiber according to claim 5, wherein an optical fiber having a transmission distance more than 500 m is characterized in that:

a maximum time delay difference at the entire area of a core is within 0.15 ns/km, and a maximum time delay difference in a range where a radial offset is 5 to 18 μm is within 0.15 ns/km.

* * * * *